Sept. 13, 1960 J. B. BOTTEN 2,952,366
PORTABLE RACK
Filed Oct. 1, 1958
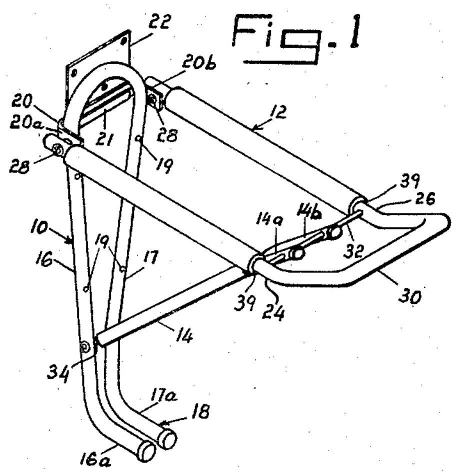
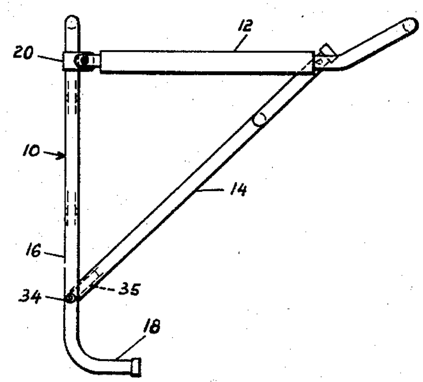
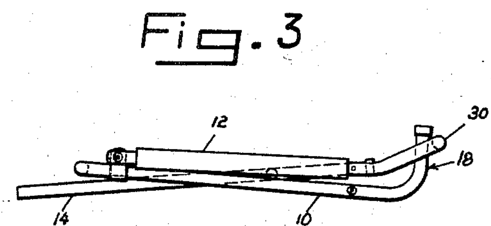
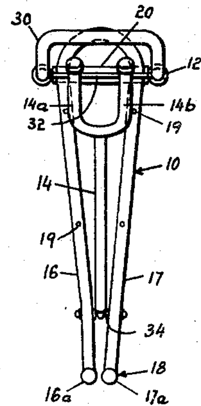
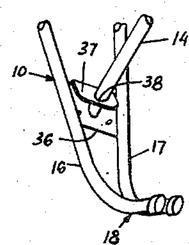
Fig. 6
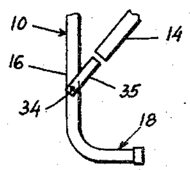
INVENTOR.
JOHN B. BOTTEN
BY
Bates, Teare & McBean
ATTORNEYS United States Patent Office 2,952,366

Patented Sept. 13, 1960

2,952,366

PORTABLE RACK

John B. Botten, Russell Township, Geauga County, Ohio (Hemlock Point Road, Chagrin Falls, Ohio)

Filed Oct. 1, 1958, Ser. No. 764,666

2 Claims. (Cl. 211—93)

This invention relates to racks upon which objects may be supported or hung and more particularly to such a rack that is portable.

In barns, riding stables and like buildings, horse and pony saddles are commonly hung from a hook fastened to a wall of the building. When a saddle is so hung, it hangs in an unnatural position which soon draws the saddle out of shape, greatly injures its structure and appearance, and causes it to rapidly deteriorate. Prior saddle racks fail to optimumly support the saddle in a natural position. Additionally, such prior racks lack the feature of portability, this latter feature being necessitated by the fact that, in many instances, the racks are carried from one location to another, as in the case of their use with race horses or show horses. Accordingly, it is highly desirable that the rack be constructed so that it may be quickly and simply secured to a wall or easily removed therefrom, as required, and folded into a small compact unit.

An object of the present invention is to provide a saddle rack which will support a saddle in a natural position.

A further object of the invention is to provide a saddle rack which may be simply and quickly secured to a wall or easily removed therefrom, as required.

A further object of the invention is to provide a saddle rack which may be folded into a small compact unit.

A further object of the invention is to provide a saddle rack which allows free circulation of air around a saddle supported thereon, thereby enabling the saddle to be dried out after use.

A further object of the invention is to provide a saddle rack which, when secured to a wall, may be folded out of the way substantially flush with the surface of the wall when not in use.

Briefly, the foregoing objects are accomplished by the provision of a portable, folding, saddle rack adapted to be simply and quickly secured to a wall. The rack includes an upstanding vertical frame portion adapted to be secured to a wall and having hinged thereto, adjacent its upper end for rotation in a vertical plane, a saddle supporting arm or shelf, such a shelf being rotatable to a horizontal saddle-holding position. The shelf is configured to support a saddle in a natural position when disposed in such horizontal position. The shelf is maintained in such horizontal position by a diagonally disposed supporting prop or brace, the upper end of which is hinged to the shelf adjacent the outer end thereof for rotation in a vertical plane, the lower end of such brace being detachably secured by any suitable means to the frame portion adjacent the lower end thereof. With this construction, the rack may be folded into a small compact unit by detaching the brace from the bottom of the frame and rotating or folding such brace into the plane of the shelf, after which the shelf (with the brace folded thereinto) may be folded into the plane of the frame portion. The frame portion may have a horizontal cross plate or rib adjacent its upper end which is adapted to hook onto a coacting flange hook secured to a wall, thereby enabling the saddle rack to be quickly and simply hung on the wall in secure operative position thereon.

Other objects and advantages of the invention will be apparent from the following description taken in conjunction with the accompanying drawings in which:

Fig. 1 is a perspective view of a saddle rack constructed in accordance with the invention;

Fig. 2 is a side elevational view of the saddle rack shown in Fig. 1;

Fig. 3 is a side elevational view of the rack shown in Fig. 2 in folded position;

Fig. 4 is a front elevational view of the rack shown in Fig. 2;

Fig. 5 is a side elevational view of the lower brace connection and showing the position of the parts prior to the assembly thereof;

Fig. 6 is a perspective view of a modification of the connection shown in Fig. 5.

The present invention is directed to a wall-mounted rack which may be folded into a compact unit. Although the invention is described with reference to a rack for supporting horse and pony saddles and associated equipment, it will be understood that the rack may be used in any type of application wherein a portable, object-supporting rack is required which may be easily attached to a wall and quickly and simply detached therefrom, as required, and folded into a compact unit.

Referring to Fig. 1, there is shown a saddle rack comprising an upstanding vertical frame portion, generally designated as 10, and having a saddle supporting shelf portion 12 hinged for rotation in a vertical plane adjacent the upper end of the frame. The shelf 12 may be rotated to a horizontal saddle supporting position, as shown, and maintained in such position by the diagonal prop or brace 14 rotatably secured at its upper end to the shelf 12 adjacent the outer end thereof, the lower end of such brace being detachably secured to the frame 10 adjacent the lower end thereof in a manner to be hereinafter described.

The frame 10, in the preferred form, comprises a structural tube or pipe bent into a substantially inverted U-shape and forming the downwardly extending spaced arms 16 and 17, the lower or free ends **16*a* and 17*a* respectively thereof being bent outwardly in a substantially horizontal direction to form a hook portion 18, which is adapted to support the bridle or other tack. It is to be noted that the hook portion 18 includes the spaced arm portions 16*a* and 17*a* over both of which the bridle or other tack may be hung. Such structure provides a natural support for the bridle or other tack and prevents the leather thereof from forming a sharp bend or crease and eventually cracking. Wall mounting means for the rack may be provided and, in the present instance, takes the form of a U-shaped cross plate 20 disposed on the upper end of the frame 10 and adapted to hook onto the hook portion 21 of the coacting wall mounted flange hook 22, thereby enabling the rack to be simply and quickly mounted on a wall and easily removed therefrom as required. The rack may be secured to a wall also by means of bolts or screws passed through the apertures 19** in the frame.

The saddle supporting shelf 12, in the present instance, comprises a U-shaped tube or pipe having the spaced arms 24 and 26, the free or inner ends of which are rotatably secured to the spaced arms **20*a* and 20*b* respectively of the cross plate 20 by any suitable means, as for example the bolts 28. The outer end portion 30 of the shelf 12 is bent upwardly to conform to the contour of the saddle. Such end portion 30 functions also to keep the saddle from slipping off the outer end of the rack. The aforedescribed spaced arm construction of the shelf 12** enables the shelf to support the saddle in a natural position and allows free circulation of air around the saddle when it is supported thereon, thereby enabling the saddle to dry out after use, thus preventing mildew.

To maintain the shelf 12 in a horizontal position, a pipe or brace 14 is provided the upper end of which is rotatably connected to the shelf adjacent the outer end thereof, the lower or inner end of the brace being detachably secured to the frame 10 adjacent the lower end thereof. The upper end of the brace 14, in the present instance, is formed into a U-shaped bifurcated end portion including the outwardly extending spaced arms 14*a* and 14*b*, which are rotatably secured to the cross bar 32 extending between the shelf arms 24 and 26 as shown. However, the brace 14 may comprise a simple bar or rod, the upper end of which may be rotatably secured directly to the cross bar 32.

Disposed adjacent the lower end of the frame 10 is a rotatable T-fitting 34 (Figs. 1–5) interposed between the arms 16 and 17, the cross portion of the fitting being rotatably mounted between such arms as shown. With this construction, the fitting 34 may be rotated upwardly in a vertical plane until the leg 35 thereof is in line with the brace 14 as shown in Fig. 5. Next, the brace 14 may be telescoped onto the leg 35 to complete the lower detachable connection for the brace, such brace having a bore with a diameter greater than the diameter of the leg 35.

A modification of the lower detachable connection for the brace 14 is shown in Fig. 6. As illustrated, a plate 36 is secured to the arms 16 and 17 adjacent the lower end thereof, such plate having a downwardly extending flange 37 having an aperture 38 therein of a diameter slightly larger than that of the brace 14. The brace 14 is telescoped into the aperture 38 until it strikes the plate 36, said plate functioning as a stop for the brace.

The aforedescribed construction enables the rack to be folded into a small compact unit as shown in Fig. 3. This may be accomplished by removing the rack from the wall, detaching the brace 14 from the frame 10 and folding the brace into the plane of the shelf 12, and thence folding the frame 10 into the plane of the shelf.

Additionally, when the rack is disposed on the wall it may be folded into an inoperative position substantially flush with the wall by detaching the brace 14 from the frame 10 and folding the shelf 12 downwardly into the plane of the frame. At this point, the brace 14 will hang downwardly between the frame legs 16*a* and 17*a* and in the plane of the frame.

The shelf arms 24 and 26 may be provided with sponge rubber tubing 39 or the like, as shown, to protect the saddle lining and to prevent the saddle from slipping laterally off of the rack.

The rack of the invention may be adapted also for use in scaffolding structures on the wall of a building. This may be accomplished by attaching a conventional hook onto the upper end of the frame to enable the rack to be hung on a window sill. When two or more racks are so hung adjacent each other, planks or boards may be placed thereon, to support workmen or painters and their materials.

The terms and expressions which have been employed are used as terms of description, and not of limitation, and there is no intention, in the use of such terms and expressions, of excluding any equivalents of the features shown and described, or portions thereof, but it is recognized that various modifications are possible within the scope of the invention claimed.

I claim:

1. A saddle rack for supporting horse and pony saddles comprising, a normally vertical inverted U-shaped frame, a normally-horizontal saddle-supporting shelf configured to support a saddle in a natural position and having its inner end rotatably connected to said frame adjacent the upper end thereof to enable the shelf and frame to be folded together, said shelf including a pair of arms of greater length than the frame and spaced apart a greater distance than the width of the frame to enable the frame to be folded at least partially into the shelf, a diagonally disposed brace detachably secured at one of its ends to said frame adjacent the lower end thereof, the other end of the brace being rotatably secured to the shelf adjacent the outer end thereof to enable the brace and shelf to be folded together, and means for detachably mounting the rack on a wall, said frame including a pair of arm members spaced from each other in a manner permitting the brace to be disposed between such arm members when the frame and shelf are folded together and when the brace and shelf are folded together thereby effecting a small compact unit when the rack is so folded.

2. A saddle rack for supporting horse and pony saddles comprising, a vertically disposed wall-mounted frame, means for detachably mounting the frame on a wall, a horizontally-disposed U-shaped saddle-supporting shelf configured to support a saddle in its natural position and including a pair of spaced arms having the inner ends thereof rotatably secured to said frame adjacent the upper end thereof, a cross-bar joining said arms adjacent the outer free ends thereof, and a single unitary diagonally disposed pipe forming a brace having one of its ends formed into a bifurcated end portion rotatably secured to the cross-bar interiorly of said arms, the other end of said pipe being detachably secured to the frame adjacent the lower end thereof, the outer end of said arms being connected and forming an end portion which extends outwardly and upwardly with respect to the frame to define a configuration for receiving a saddle in a natural position, said frame including a lower hook portion comprising a pair of spaced arms extending in a substantially horizontal outward direction from the frame to define a configuration for supporting a bridle and associated saddle equipment in a natural position.

References Cited in the file of this patent

UNITED STATES PATENTS

| | | |
|---|---|---|
| 152,207 | Wyman | June 16, 1874 |
| 516,504 | Moore | Mar. 13, 1894 |
| 808,142 | Danhour | Dec. 26, 1905 |
| 1,572,295 | Kofsky | Feb. 9, 1926 |
| 2,433,275 | Higby | Dec. 23, 1947 |
| 2,740,532 | Kleinsmith | Apr. 3, 1956 |

FOREIGN PATENTS

| | | |
|---|---|---|
| 616,884 | France | Nov. 6, 1926 |